United States Patent

Anders et al.

[11] 4,261,509
[45] Apr. 14, 1981

[54] PNEUMATIC SWITCH CONTROL FOR PNEUMATIC ACTUATOR IN AIR CONDITIONING CONTROL SYSTEMS

[75] Inventors: Jude R. Anders, Glendale; Dennis E. Miller, Greendale, both of Wis.

[73] Assignee: Johnson Controls, Inc., Milwaukee, Wis.

[21] Appl. No.: 62,916

[22] Filed: Aug. 2, 1979

[51] Int. Cl.³ .......................... F24F 7/00; F16K 31/12
[52] U.S. Cl. .................................. 236/49; 137/487.5; 236/84; 236/46 F
[58] Field of Search ................... 236/84, 79, 49, 46 F; 137/487.5; 251/129

[56] References Cited

U.S. PATENT DOCUMENTS

| | | |
|---|---|---|
| 2,411,834 | 11/1946 | Parsons .................................. 236/84 |
| 3,269,689 | 8/1966 | Lee .................................. 251/129 X |
| 3,307,824 | 3/1967 | Weisheit ........................ 137/487.5 X |
| 3,369,561 | 2/1968 | Zimmerman et al. ......... 137/487.5 X |
| 3,411,704 | 11/1968 | Hilgert et al. ...................... 236/84 X |
| 3,914,581 | 10/1975 | Gilson ............................... 137/487.5 |

Primary Examiner—William E. Wayner
Attorney, Agent, or Firm—Andrus, Sceales, Starke & Sawall

[57] ABSTRACT

Heating, ventilating and air conditioning control systems commonly use pneumatic actuators. A digital logic control has first and second output ports applied to control the actuator through dual channels, including an air supply channel and an air exhaust channel. Various sensed and related input signals are processed by the logic device and generate control signals at the control signal ports. Each channel includes an electrically controlled switch unit having an electrical operator and a pneumatic switch for controlling the flow to and from the pneumatic actuator. The switch may take the form of an electromagnetically actuated flow valve opening and closing a flow path from a supply or exhaust to the pneumatic actuator or, in the case of the supply channel, the form of a small electrically operated pump unit. The actuation of the actuator is controlled either on a time or frequency basis to set the actuator in the proper position. Pneumatic restrictor means in output lines to the actuator provide fluid rate control to and from the actuator.

10 Claims, 4 Drawing Figures

PNEUMATIC SWITCH CONTROL FOR PNEUMATIC ACTUATOR IN AIR CONDITIONING CONTROL SYSTEMS

TECHNICAL FIELD

This invention relates to heating ventilating and air conditioning control system employing pneumatic switch devices for driving pneumatic actuators.

BACKGROUND OF THE INVENTION

Heating, ventilating, and air conditioning control systems have been widely developed based on pneumatic as well as electronic control components. Pneumatic control systems may rely on the flow of air to transmit control and operating signals to the various control and operating components. Electronic and electrical control systems which include electrical control and operating signals to operate electrical devices have been widely used in various industrial and institutional control systems, including heating ventilating and air conditioning systems. With significant advances in electronic logic devices, and particularly small digital computing devices, various compound control systems have been developed employing pneumatic sensing and actuating devices with interposed electronic signal processing devices. Thus the advance of electronic logic devices such as the digital computers have resulted in a greater capability of manipulation and processing of various signals, with the ability to process complex control algorithms based upon sensed conditions, with and without modifications. Modern electronic devices also permit improved communication with other electronic instrumentation and controlled devices. In order to adapt the improved logic-type digital devices to the pneumatic controls, the electrical signals must be converted to an appropriate form for controlling transmission of pneumatic pressure signals to pneumatic control devices such as pneumatic actuators and the like.

SUMMARY OF THE PRESENT INVENTION

The present invention is particularly directed to heating, ventilating and air controlled system employing a digital logic control and signal processing means which generates digital control signals at a pair of output ports applied to control pneumatic actuator means through dual channels, each of which includes an electrically activated pneumatic source or switch device. The dual channels include an air supply channel and an air exhaust channel. Thus, in accordance with the present invention, the various sensed and related input signals are transmitted directly, or after appropriate conversion to an electrical digital signal, to the logic device where the signals are suitably processed to generate output control signals at first and second control ports, one for each of the dual channels. Each channel includes an electrically controlled switch means having an electrical operator and a pneumatic switched means for controlling the flow to and from the pneumatic actuator. The switched means may take the form of an electromagnetically actuated flow valve means opening and closing a flow path from a supply or exhaust to the pneumatic actuator or, in the case of the supply channel, the form of a small electrically switched pump unit. The one channel provides a controlled air supply while the opposite channel provides a controlled exhaust of the air from the pneumatic actuator. Each channel is separately controlled from the command logic unit, and actuated when the actuator is to reposition the controlled device. When the latter is properly positioned, both channels are off and actuator is locked in position. In one embodiment, the system employs a suitable sensing network for developing appropriate electrical signals which are converted to a digital input to the logic processing unit such as a computer. The computer has a first output port to an air supply channel and a second output port to an exhaust channel. Further, the actuation of the actuator is controlled either on a time or frequency basis by generating suitable variable width control signals, or a constant pulse signal at a variable rate. In each system, the digital output directly controls the operation drive period of the pneumatic actuator and thereby the position of the actuator.

In addition, pneumatic restrictor means provided in the individual output lines of the separate channels, or in a common control line to the actuator, provide fluid rate control to and from the actuator. The restrictors provide a simple, reliable rate control means for modifying the air volume supplied to or exhausted from the actuator as the result of the operation of the air switching means.

The electropneumatic logic control system of this invention particularly provides an effective processing of control algorithms, with an appropriate implementation and modification.

DESCRIPTION OF THE DRAWING FIGURES

The drawings furnished herewith generally illustrate the best mode presently contemplated for the invention and are described hereinafter.

DESCRIPTION OF THE ILLUSTRATED EMBODIMENTS

Figure 1:
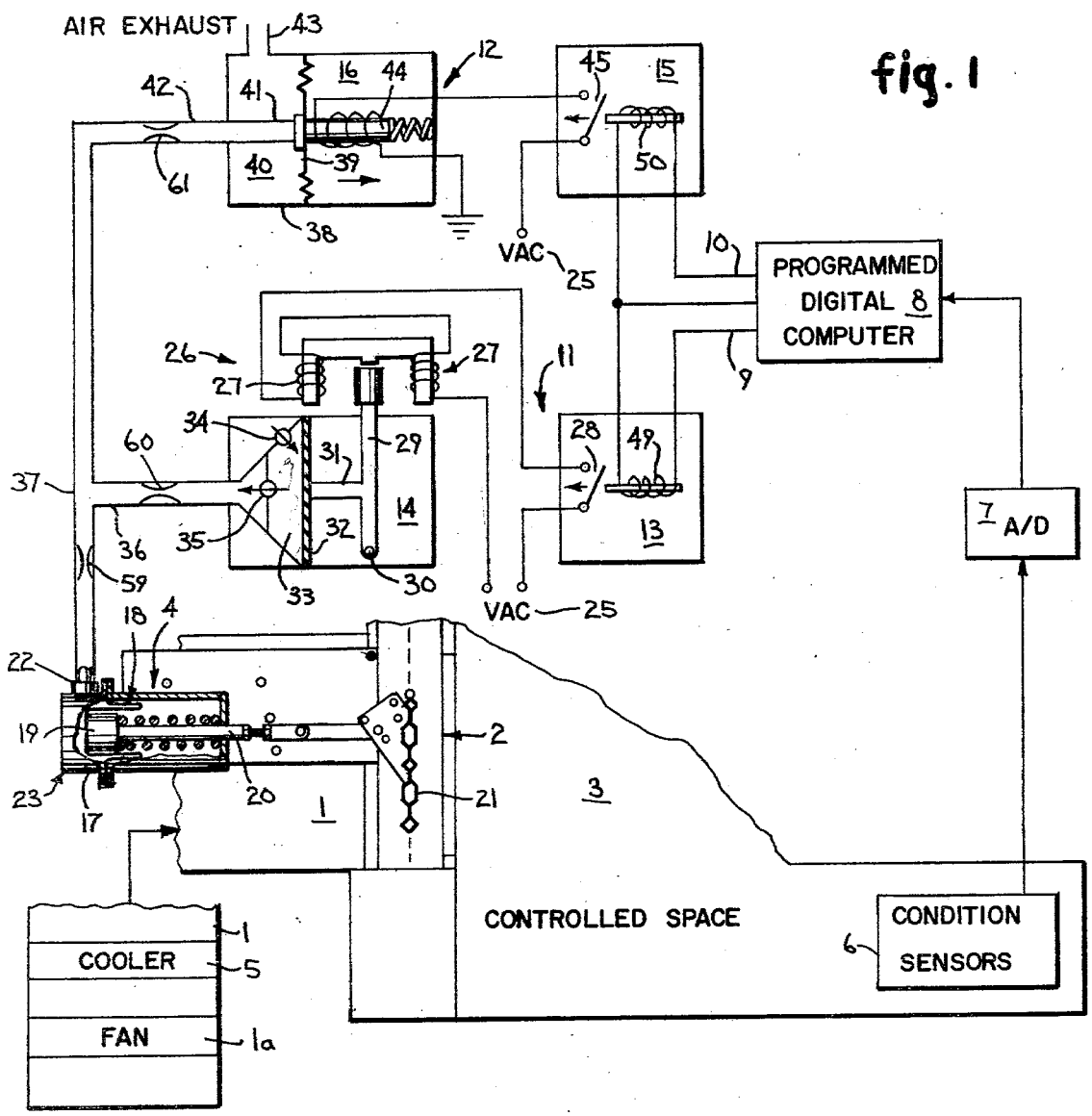
FIG. 1 is a diagrammatic illustration of an electronic signal processing means having first and second outputs controlling a pneumatic air exhaust switch and an air pump for driving and controlling pneumatic actuators.

Referring to the drawings and particularly to FIG. 1, a heating ventilating and air conditioning system is illustrated including a source or supply 1 of conditioned air which is selectively supplied through a control damper unit 2 to an enclosed area 3, such as a room. Supply 1 is shown as an air duct which includes a fan unit 1a for creating air flow. Damper unit 2 includes a pneumatic actuator 4 for adjusting the opening and closing of damper unit 2 and thereby providing and maintaining the air within the enclosure at a predetermined condition. The air from supply 1 may be passed through a suitable conditioning device 5 such as a heating device, a cooling device, a humidity device, and/or combinations thereof to appropriately condition the air supplied to area 3. Sensors 6 are provided within the enclosed area and provide electrical output signal proportional or otherwise particularly related to the desired controlled condition. For simplicity of discussion, a temperature control system is described, and the electrical output of sensor 6 are typically suitable electrical analog signal. In accordance with the illustrated embodiment, the analog signal is converted by a suitable analog-to-digital converter 7 to a corresponding digital signal. The converter 7 is connected as the input to a logic control device which may be and preferably is a suitable computer 8 to develop a plurality of basic control outputs for the total heating ventilating and air conditioning system. For the present invention, computer 8 includes first and second output ports 9 and 10 connected, respectively, to drive individual control channels 11 and 12, one of which develops an air supply to the pneumatic actuator 4 and the second of which provides a separately controlled exhaust for exhausting the air from the pneumatic actuator 4. In the embodiment of FIG. 1, channel 11 includes an electromagnetic switch 13 controlling a pneumatic pump 14 to supply air to actuator 4. Channel 12 also includes an electromagnetic switch 15 controlling a pneumatic leakport valve unit 16 connected to exhaust air from the actuator 4. The output signals are applied to the channels 11 and 12 to either activate the pump unit 14 to supply air to the actuator 4 or the leakport unit 16 to exhaust air from the actuator 4.

Thus, the controlled device 2, whether a damper, a valve, fan or other interrelated device is coupled to a suitable pneumatic actuator 4 adapted to be positioned and controlled by air pressure signal and correspondingly oppositely positioned by exhausting of the air.

The system control operating components may thus be any well known devices and are only briefly described herein sufficient to clearly understand the present invention which is particularly directed to the two-port, dual channel control system applied to interface the digital output signal of the logic processing unit such as the digital computer 8 to a pneumatic actuator or operator 4.

The pneumatic actuator 4 is shown diagrammatically as a standard known piston operator 4 including an outer two-piece cylinder 17 having a piston diaphragm 18 preferably clamped between the interconnected cylinder members. A spring-loaded piston 19 is mounted within the cylinder with a piston rod 20 extending outwardly for interconnection to a damper 21. A single air supply port 22 is connected to the closed head portion 23 of the cylinder 17 such that input air is introduced in the chamber defined between the closed cylinder head 23 and the diaphragm 18. Air pressure supplied from the pneumatic air supply channel 11 moves the piston 19 against the opposing force of the spring. The stroke of the piston rod 20 is, of course, proportional to the air pressure, within the spring range. Thus, pressurized air extends the piston rod and conversely exhausting air retracts the piston rod 20 to the position where the spring force and air pressure again balance. Such piston operators are well known, and a commercial unit is manufactured and sold by Johnson Controls, Inc., the asignee of this invention and identified as Johnson D-251 Piston Damper Operator. Generally, such devices operate with a maximum control pressure of 25 PSIG. The spring range which controls the effective required pressure is normally provided with various nominal ranges permitting control in various ranges within a total range of 3 to 13 PSI. In accordance with the illustrated embodiment of the invention each control channel 11 or 12 is fully on or fully off as a result of digital control signal. When the operator 4 is to be extended, the air supply channel 11 is actuated. Conversely when the operator 4 is to be retracted, the air exhaust channel 12 is actuated.

More particularly as shown in FIG. 1, air supply channel 11 includes the air pump unit 14 connected to an operating alternating current supply 25 by switch 13, shown as electrical relay. The relay 13 in turn is controlled by the digital output from the computer 8 and the air pump unit 14 is either on or off. The air pump may be any suitable small unit adapted to generate pressurized control air within the required operating range of the pneumatic operator. For example, a highly satisfactory air pump unit is shown in U.S. Pat. No. 3,936,245, to A. Hilgert and diagrammatically illustrated in FIG. 1. Generally the air pump includes an electromagnetic drive 26 having a winding 27 connected selectively to the AC supply 25 by the relay contacts 28 of the electric relay 13. The drive 26 includes a pivotally mounted core 29 mounted within the field of winding 27 and pivoting about its support pivot 30, as more fully described in the above United States patent. A pump operating link 31 is connected to a diaphragm 32 forming one wall of a pumping chamber 33. An air inlet includes a check valve 34 permitting introduction of air from the atmosphere into the pump chamber 33. An outlet is also provided with a check valve 35 permitting discharge of air from the pump chamber 33 to a discharge line 36. Thus, whenever the electric relay 13 is energized, the power contacts 28 are closed and the pump core 29 vibrates, and the diaphragm 32 reciprocates. As the diaphragm 32 reciprocates, air is drawn into the pumping chamber 33 during one half cycle and then during the opposite half cycle or stroke, air is discharged through the valved outlet 35. Relatively compact air compressors with a high degree of efficiency, such as in the above identified patent, are commercially available. As previously noted, the air pressure in heating, ventilating and air conditioning system is on the order of 25 PSI. The pump output line 36 is connected to the common input-output line 37 to the pneumatic operator 4 to supply air to the piston chamber for extension of the pneumatic operator.

Conversely, the air exhaust channel 12 provides for the retraction or resetting of the pneumatic actuator 4. In the illustrated embodiment of the invention, a simple electromagnetic air switch 16 of a leak port construction is shown. The air switch 16 includes an outer housing 38 having a centrally located diaphragm 39 defining an output control chamber 40 to the one side thereof. The output chamber includes an output orifice 41 mounted in opposed relation to the diaphragm 39 such that it is opened and closed by the selective positioning of the diaphragm 39. Orifice 41 is connected by an output connecting line 42 to the common input-output line 37 to actuator 4. The output chamber 40 is also provided with an exhaust port 43 exhausting directly to atmosphere. The diaphragm 39 as shown is normally mounted in overlying engaged relationship with the orifice 41 to provide a normally closed pneumatic switch structure. A spring-loaded electromagnetic armature 44 is secured to the backside of the diaphragm 39, and connected to the AC source 25 by electric relay 15 having normally open contacts 45. When energized, the armature 44 retracts and holds the attached diaphragm 39 in a retracted position, completely opening the orifice 41 and connecting the input-output line 37 to the air exhaust port 43, thereby providing for exhaust of air from the pneumatic actuator.

Relays 13 and 15 are similarly constructed, and each include an operating coil 49 and 50 connected to the supply and exhaust signal ports 9 and 10 of the computer 8. The computer 8 provides a closing signal via port 9 to the relay coil 49 to close the contacts 28 and energize the pump 11 or via port 10 to relay coil 50 to close contracts 45 and energize the electromagnetic operator 44.

Figure 2:
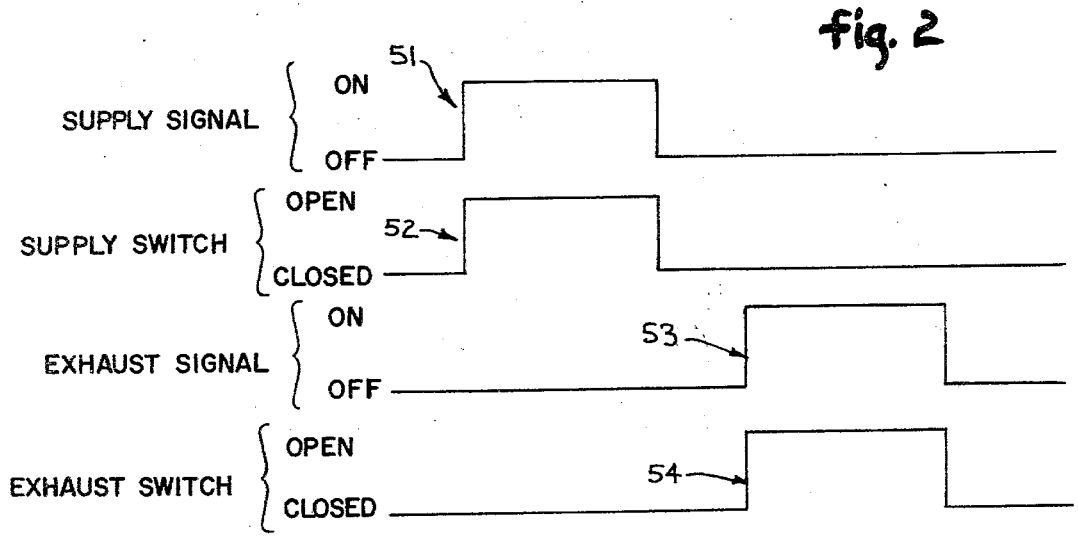
FIG. 2 is a graphical illustration of a time width control of the system of FIG. 1.

In summary, one or more conditions are sensed by the sensor means 6 and the appropriate signal or signals are transmitted to the computer 8 or other logic means where the signals are processed through a predetermined algorithm to provide appropriate implementing signals at either supply port 9 or exhaust port 10. Thus, at certain preprogrammed conditions, command signals are issued to either the supply air channel 11 via supply signal port 9 or the exhaust air channel 12 via the exhaust signal port 10, and correspondingly air is supplied to or exhausted from the actuator 4. The amount of air exhausted or supplied is determined by a suitable logic system. For example, the computer can provide a timed control by varying the length of the command signal, the duration of which is directly related to the control algorithms employed. The output signal 51 and the channel switch condition 52 are directly related, as shown for example in FIG. 2. Trace 51 of FIG. 2 illustrates the air supply channel. When air is commanded, The signal at port 9 increases and the air pump 14 is energized. The air pump 14 operates continuously during the period of the signal 51 and maintains supply air to the pneumatic actuator 4. When the command signal drops to zero or off, the pump 14 turns off essentially instantaneously, thereby removing of the air supply and trapping the supplied air in line 37 and actuator 4 which is thus locked in the actuated position.

Alternately, when the operator 4 is to be retracted, the computer 8 provides a command signal to the exhaust port 10, as shown at trace 53. The increased signal, essentially instantaneously actuates the relay 15 and pneumatic switch 16 which opens as shown at 54 in FIG. 2. The exhaust switch 16 remains open for the period of the command signal 53 to continuously exhaust the operator.

Thus, FIG. 2 illustrates a pulse width modulation control of one or the other of the channels 11 and 12.

Figure 3:
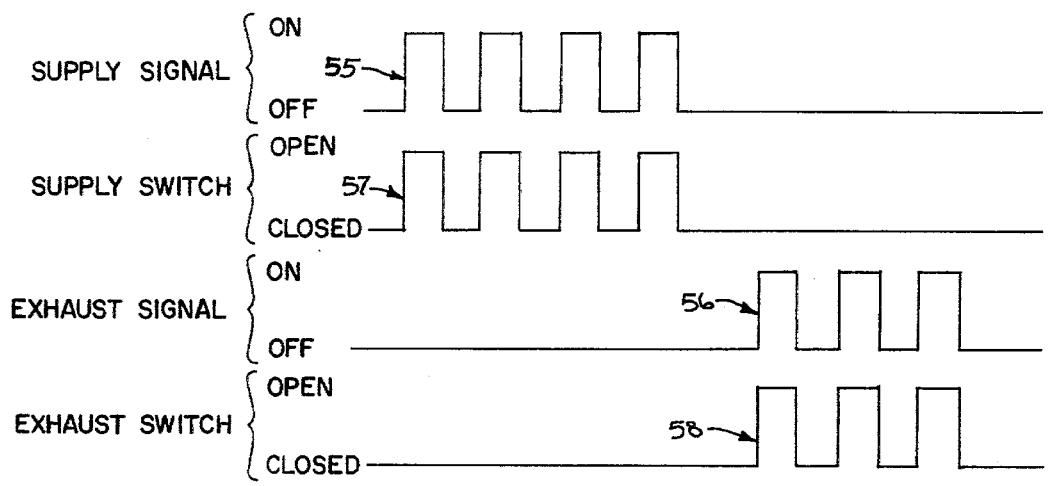
FIG. 3 is a view similar to FIG. 2 illustrating a pulsed frequency control.

Alternative, pulse frequency modulation control can readily be provided as illustrated in FIG. 3. Thus the logic device such as a computer 8 may readily provide a constant rate or frequency pulse signal, with a number of fixed durations command signals to channel 11 or 12, as shown by traces 55 and 56 in FIG. 3. The frequency of the signals on the on-period of the frequency signal generator is directly controlled by the computer 8 in accordance with the control equation. Thus, rather than providing a continuous signal, the device provides a series of pulse signals at either supply port or exhaust port and therefore to either supply channel 11 or to the exhaust channel 12. The respective relays 13 and 15 will be correspondingly energized by traces 57 and 58 in FIG. 3. A pulsed operation of the channel switching means is thus established with the volume of air supplied or exhausted related to the time duration of each pulse and the number of pulses.

During the period that no control action is being executed, air line 37 is completely closed and locks the pneumatic operator 4 in the desired position.

The supply system to the operator 4 advantageously includes pneumatic flow restrictor means to control the fluid flow rate to and from the actuator. if a common rate control is desired, a single common restrictor 59 may be provided in the common line 37 to the single port of the actuator. If individual control of the air supply and the air exhaust is desired or required, separate restrictors 60 and 61 are connected in the separate output channel lines 36 and 42 of the supply channel and the exhaust channel. This latter system permits setting of different rates of extension and retraction of the pneumatic operator.

Figure 4:
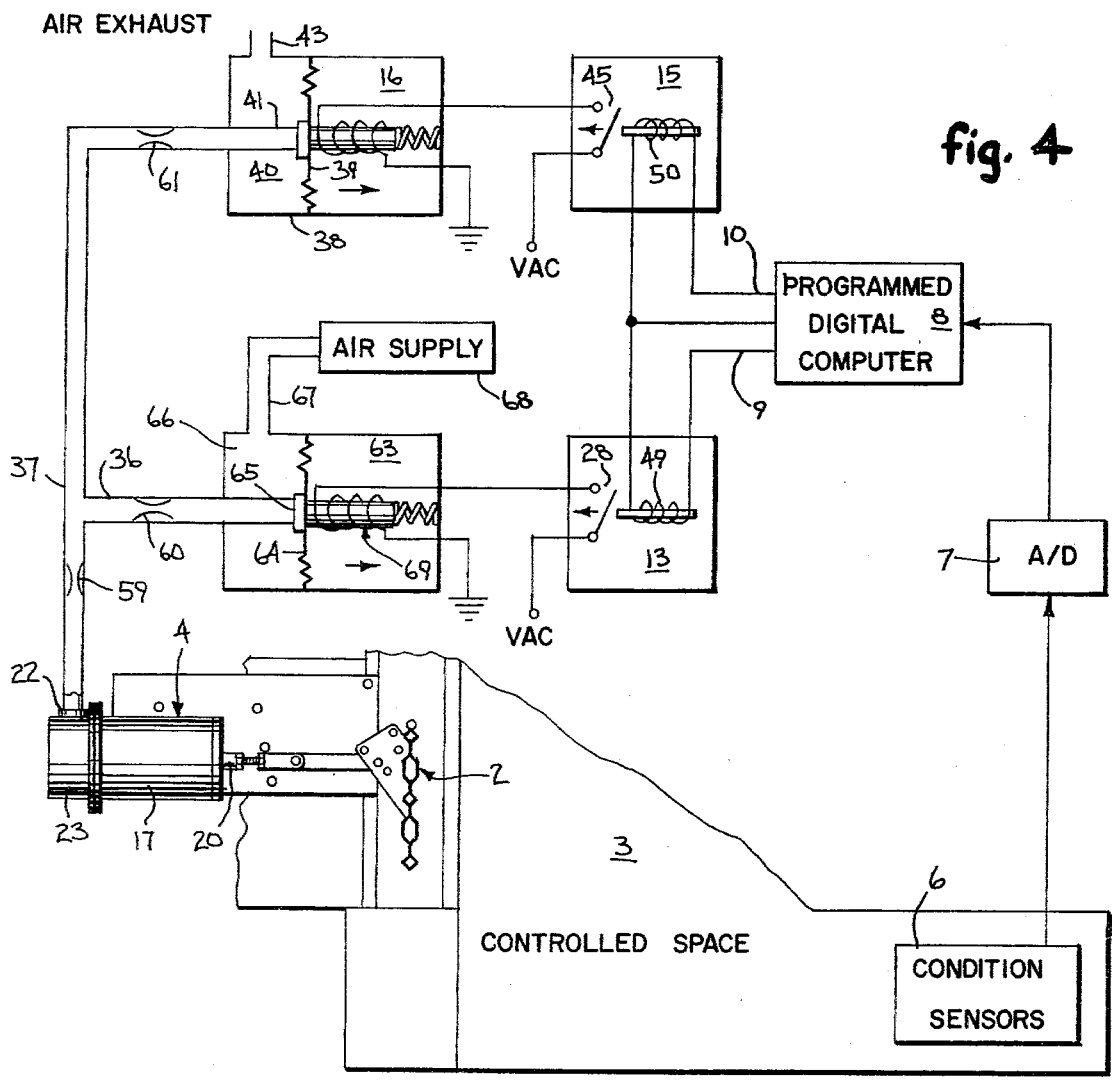
FIG. 4 is a view similar to FIG. 1 illustrating a similar dual-ported system employing a pair of electropneumatic flow control switches.

An alternate embodiment is shown in FIG. 4 in which an electromagnetic air switch 63 replaces the air pump unit 14 of FIG. 1. In other respects, the embodiment of FIG. 4 corresponds to that of FIG. 1 and the corresponding elements are correspondingly numbered for simplicity and clarity of description.

The switch unit 63 is a leakport unit which may be identical to air switch unit 16. Thus, switch unit 63 includes a diaphragm 64 overlying an orifice 65 which is connected to supply line 36. Diaphragm 64 also defines a chamber 66 having a port 67, which in FIG. 4 is connected to a pressurized source of air 68. A spring-loaded electromagnetic operator 69 is coupled to the diaphragm to open the orifice 65 in response to energization thereof. The operator is connected to power by the relay 13, as in FIG. 1.

When computer 8 generates a supply signal at port 9, the switch unit 63 opens and pressurized air is supplied to the actuator 4 to extend the piston rod 20 and correspondingly open damper unit 2. The reverse positioning of damper unit 2 results by exhaustion of the air from actuator 4 through the switch unit 16, as in the first embodiment.

The ordinary worker skilled in the art can readily provide the necessary hardware and programming for implementation of the present invention using readily available and known hardware as well as well known computer technology. However, an operable control algorithm with appropriate flow charts and a computer program is set forth in the attached Appendix to this application for the convenience and direction to those involved in the interest therein. A flow chart for the pulse width control output is shown in FIG. 1 of the attached Appendix. A similar flow chart for the pulse frequency control output is given in FIG. 2 of the Appendix. The appropriate illustrated algorithms do not provide for and include the various operator, conversion and timing functions such as employed in the logic control device program. Such detail is particularly dependent or related to the present invention and will be readily provided by those skilled in the art and is not set forth to avoid prolix presentation herein. A suitable program listing for determining the output command for the pulse width and/or frequency control systems is set forth in FIG. 3 of the attached Appendix. The program includes the basic portion for the generation of the control output and includes that part which is particularly applicable to the illustrated embodiments. An actual total systems program would include the usual communication, timing and other known functions as employed in the standard programs. Once again, such detail is not unique to the present program and would not add to the teaching of how to carry out the invention or to a best mode. Thus, such detail is standard in conventional programming and the detail is dependent on a programmer's preferences and systems. Thus, all detail not set forth are of conventional design criteria would be readily provided with a minimum skill and time based on ordinary skill and techniques with minimal time involved.

Various modes of carrying out the invention are contemplated as being within the scope of the following claims particularly pointing out and distinctly claiming the subject matter which is regarded as the invention.

We claim:

1. An environmental air conditioning control system for controlling the environmental air in an enclosed area, comprising a sensor means for sensing of the conditioned environmental air and generating a signal in accordance with the state of said environmental air, pneumatic means having an output element for changing of the conditioned air means and thereby controlling the conditioned air supplied to said enclosure, said pneumatic means having port means for receiving and exhausting of air to establish reversible positioning of said output element, a digital logic processing means connected to said sensor means and including a supply air signal port and an exhaust air signal port, said processing means processing said signal in accordance with a selected sequence to generate opposite logic signals at said ports, an air supply means having a pump means having an electrical operator means for operating the pump means and a pneumatic supply switch means for supplying air to said pneumatic means, said supply switch means being connected to said supply air signal port for turning said pump means wholly on and off, a switched exhaust means having an electrical exhaust valve means and a exhaust switch means connected to said valve means for exhausting air from said pneumatic means, said exhaust switch means being connected to said exhaust air signal port.

2. The environmental air conditioning control system of claim 1 wherein said exhaust switched means includes a diaphragm actuated valve means selectively connecting a first port connected to the actuator and a second port connected to the atmosphere for exhausting of air from the pneumatic means.

3. The control system of claim 2 wherein said pump means includes a diaphragm actuated valve means selectively connecting a first port connected to the atmosphere to a second port connected to port means for supplying air to said pneumatic means.

4. The control system of claim 1 wherein said logic processing means generates a continuous binary output at said ports for corresponding energization of said switch supply switch means on said exhaust means.

5. The control system of claim 1 wherein said logic processing means generates a pulsed binary output at said ports for corresponding pulsed energization of said supply switch means on said exhaust switch means.

6. An environmental air conditioning control system for controlling the environmental air in an enclosed area, comprising a plurality of sensor means for sensing of the conditioned environmental air and generating related control signals, a controlled means for selectively supplying of air to the enclosed area, pneumatic means for changing of the controlled air means and thereby controlling the conditioned air supplied to said enclosure, said pneumatic means having means for receiving and exhausting of air to establish reversible positioning of said controlled means and adapted to establish a fixed position when neither receiving nor exhausting air, a digital logic processing means connected to said sensor means and processing said digital signals and generating opposite varying control signals at a supply air port or an exhaust air signal port in accordance with predetermined control signals, a pump means having an electrical operator and a pump chamber connected to supply air to said pneumatic means, switch means connecting said operator to power input means and connected to said supply air signal port for operation of said pump means wholly on or wholly off for supplying air to said pneumatic means, a exhaust valve means having an electrical exhaust operator connected to said exhaust air signal port for exhausting air from said pneumatic means.

7. The environmental air conditioning control system of claim 6 wherein said exhaust valve means includes a diaphragm actuated diaphragm valve means selectively connecting a first port connected to the actuator and a second port connected to the atmosphere for exhausting of air from the pneumatic means, said exhaust operator means including an electromagnet coupled to position the diaphragm, a power supply, and a relay having a winding connected to said exhaust signal port and a contact connected between the operator means and the power supply.

8. The environmental air conditioning control system of claim 7 wherein said pump means includes a vibrating diaphragm and output means connected to supply pressurized air to the pneumatic means, said operator includes an A.C. electrical drive motor means, A.C. power input means, a relay switch means connecting said drive motor means to said power input means, said relay switch means having an input winding connected to said supply air signal port.

9. The control system of claim 8 wherein said logic processing means generates a continuous binary output for corresponding energization of said supply switch means or said exhaust switch means.

10. The control system of claim 8 wherein said logic processing means generates a pulsed binary output at said ports for corresponding energization of said pump means or said exhaust valve means.

* * * * *

UNITED STATES PATENT AND TRADEMARK OFFICE
CERTIFICATE OF CORRECTION

PATENT NO. : 4,261,509    Page 1 of 2
DATED : April 14, 1981
INVENTOR(S) : JUDE R. ANDERS and DENNIS E. MILLER It is certified that error appears in the above-identified patent and that said Letters Patent are hereby corrected as shown below:

| | | |
|---|---|---|
| Column 8, CLAIM 6 | Line 5 | After "controlled" cancel "air"; |
| Column 8, CLAIM 6 | Line 22 | After "means," cancel "a" and substitute therefore --- an ---; |
| Column 8, CLAIM 7 | Line 29 | After "to" cancel "the actuator" and substitute therefore --- said pneumatic means"; |
| Column 8, CLAIM 9 | Line 49 | After "said" insert --- relay of said ---; |
| Column 8, CLAIM 9 | Line 49 | After "exhaust" cancel "switch" and substitute therefore --- valve ---. |

UNITED STATES PATENT AND TRADEMARK OFFICE
CERTIFICATE OF CORRECTION

Page 2 of 2

PATENT NO. : 4,261,509
DATED : April 14, 1981
INVENTOR(S) : JUDE R. ANDERS and DENNIS E. MILLER It is certified that error appears in the above-identified patent and that said Letters Patent are hereby corrected as shown below:

| | | |
|---|---|---|
| Column 7, CLAIM 1 | Line 9 | After "system" insert --- having a conditioned air means ---; |
| Column 7, CLAIM 1 | Line 30 | After "and" cancel "a" and substitute therefore --- an ---; |
| Column 7, CLAIM 2 | Line 37 | After "to" cancel "the actuator" and substitute therefore --- said pneumatic means ---; |
| Column 7, CLAIM 4 | Line 48 | At beginning of sentence before "supply" cancel "switch"; |
| Column 7, CLAIM 4 | Line 48 | After "exhaust" insert --- switch ---; |

Signed and Sealed this

Seventh Day of July 1981

[SEAL]

Attest:

RENE D. TEGTMEYER

Attesting Officer     Acting Commissioner of Patents and Trademarks